United States Patent

Nguyen et al.

[11] Patent Number: 6,158,286
[45] Date of Patent: Dec. 12, 2000

[54] PROCESS AND DEVICES FOR THE DETERMINATION OF THE VIBRATIONS OF THE ROTOR OF A ROTARY MACHINE

[75] Inventors: The Tam Nguyen, Le Havre; Christian Lenclud, Vernouillet; Roland Bigret, Drancy, all of France

[73] Assignee: Total Raffianage Distribution S.A., Puteaux, France

[21] Appl. No.: 09/153,028

[22] Filed: Sep. 15, 1998

[30] Foreign Application Priority Data

Sep. 15, 1997 [FR] France ............................ 97 11449

[51] Int. Cl.⁷ .......................... G01H 11/02; G01M 13/00
[52] U.S. Cl. ................................................... 73/660
[58] Field of Search .................... 73/1.79, 1.84, 73/593, 649, 650, 658, 659, 660

[56] References Cited

U.S. PATENT DOCUMENTS

| | | | |
|---|---|---|---|
| 3,681,978 | 8/1972 | Mathias et al. | 73/660 |
| 4,423,635 | 1/1984 | Senicourt et al. | 73/660 |
| 4,464,935 | 8/1984 | McHugh | 73/660 |
| 5,686,669 | 11/1997 | Hernandez et al. | 73/660 |
| 5,717,141 | 2/1998 | Kikuchi et al. | 73/660 |
| 5,744,723 | 4/1998 | Piety | 73/660 |

FOREIGN PATENT DOCUMENTS

| | | |
|---|---|---|
| 246 637 | 11/1987 | European Pat. Off. . |
| 30 44 440 | 6/1982 | Germany . |

*Primary Examiner*—Hezron Williams
*Assistant Examiner*—Rose M. Miller
*Attorney, Agent, or Firm*—Sughrue, Mion, Zinn, Macpeak & Seas, PLLC

[57] ABSTRACT

The invention is about the process of determining the vibration of rotor (1) of a rotary machine, by elimination of interference noise signals B, in which is acquired and digitized a signal S emitted by at least one sensor C of the displacement of the rotor (1) of the rotary machine when said rotor is rotating under its normal operating conditions, then is subtracted from it a reference signal B of the same type that has been determined in advance. This process is characterized in that the reference signal B has been acquired at a speed $\Omega_b$ of rotor (1) rotation lower than the operating speed $\Omega$ and such that the signals emitted by at least two sensors (C1, C2) of the displacement of the rotor (1), offset at an angle in the same plane perpendicularly to the symmetry axis (A) of said rotor, are nearly identical, ignoring time offset. The invention also concerns the devices designed to implement such a process.

22 Claims, 2 Drawing Sheets

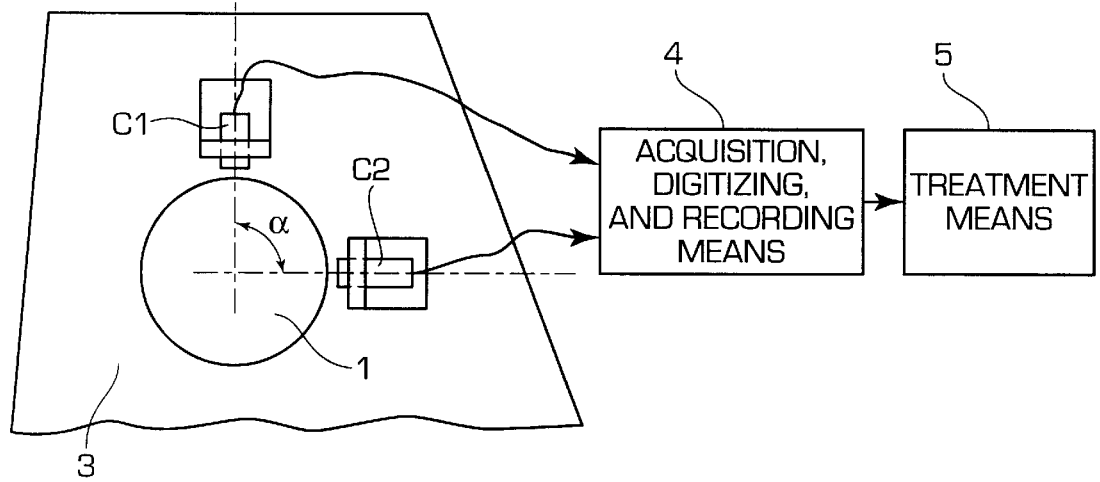
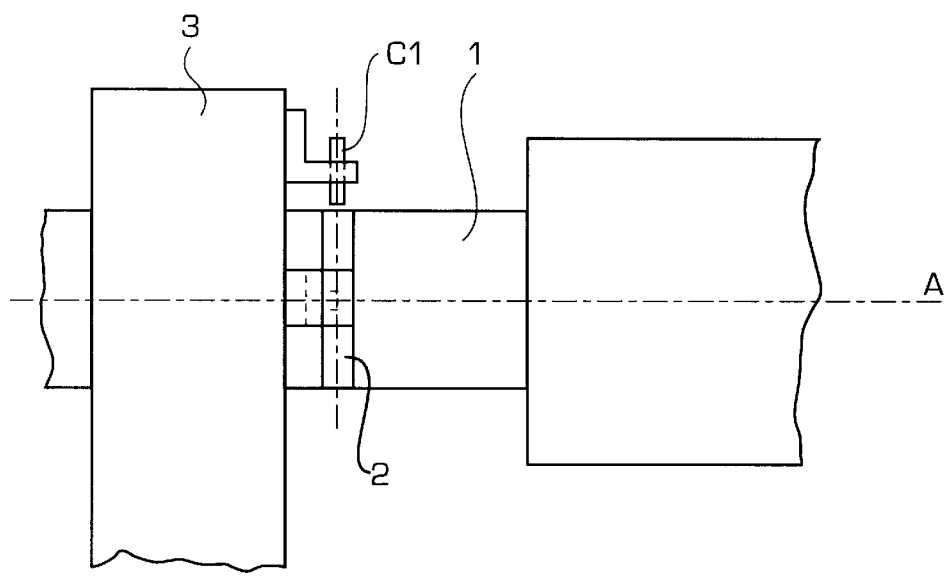

PROCESS AND DEVICES FOR THE DETERMINATION OF THE VIBRATIONS OF THE ROTOR OF A ROTARY MACHINE

BACKGROUND OF THE INVENTION

The invention relates to a process to determine the "real" vibrations of the rotor of a rotary machine, by the acquisition of the "apparent" vibration signals, then by elimination of the interference signals.

The invention also relates to devices allowing the implementation of such a process, and the use of such devices for the determination of the vibrations of the rotors of rotary machines in real time, preferably through an online system.

STATUS OF THE TECHNOLOGY

Rotary machines are used in all sorts of industries. We find them, for example, in turbo-alternator groups of electric power plants as well as compressors in refineries. Because of the conditions of their use, these machines generally rotate at great speeds, and often create great vibrations. The vibrations of these machines must therefore be monitored for safety and maintenance reasons (diagnostics permitting the detection of malfunction, accident risks . . . ).

The monitoring and analysis of their vibratory behavior, as well as the diagnosis that can be drawn from it are usually made by recording, with the help of magnetic sensors, the variable signals that reveal, over time, the apparent relative displacement of the rotors in relation to the non-rotary elements of the rotary machines.

These sensors are generally placed at the periphery of the rotor and when the rotor turns, the sensors capture, on the same perimeter as the rotor, the representative signal of its displacement (this perimeter is generally known as the "measuring path").

The signals measured by the sensors are very affected by noises from, notably, the geometric imperfections of the measuring path of the rotor and to variations, at the level of these paths, of the magnetic permeability and of the resistance of the materials of which the rotor is made. The values of the vibrations determined from these signals are thus erroneous. They correspond to vibrations said to be "apparent" rather than to be the "real" vibrations of the rotor.

The noise or "runout" may be important in relation to the value of the vibrations. It is therefore indispensable to take them into account during the evaluation of the real vibration in order to avoid making a faulty diagnosis that could result in a non-justified stoppage of the machine (false alert), or in an absence of detection of a deterioration of the rotary machine, with possibly very grave consequences (accidents, long work stoppages).

Up to now, the technology available to keep track of such noises consists of a measurement, performed by a recorder, of the "apparent" vibration signal of the rotor, and to subtract from this signal a second signal that is supposed, without verification, to be the global noise and which consists of a recording performed at low rotor rotation speed and with a single recorder, as is the case in example EP 246637.

But these techniques are not satisfactory. In reality, they do not allow the users to be certain that the value subtracted from the "apparent" vibration signal actually corresponds to the real interference affecting this signal.

SUMMARY OF THE INVENTION

The problem at the root of the invention is thus to develop a process to determine the "real" vibrations of the rotor of a rotary machine, a process in which there is prior determination that the noise that is subtracted from the "apparent" vibration signal is actually the interference affecting this signal, in order to be assured that the level obtained after the subtraction effectively corresponds to the "real" vibrations of this rotor.

Following research, the Applicant has developed a process permitting the determination of what can be considered as the real interference affecting the vibratory signals of a rotor of a rotary machine.

This process thus has for a goal the determination of the "real" relative vibrations of the rotor in relation to the non-rotary structure of a rotary machine while functioning in its usual operating environment, at a high rotation speed $\Omega$.

This process is the acquisition and digitalization of the signal S coming from at least one sensor of the displacement of said rotor while it is rotating in its usual operating conditions, then the subtraction of the noise signal referenced as B of the same type and that was determined ahead of time. This process is characterized in that the reference signal B has been acquired at a speed $\Omega_b$ of rotor rotation lower that the operating speed $\Omega$ and such that the signals that came from at least two sensors of the rotor displacement, which are offset at an angle in the same plane perpendicularly to the symmetry axis of said rotor, are sensibly identical, time offsetting being ignored.

By "signal B of the same type as signal S" we mean that B has been acquired with the aid of the same type of sensors as S, which is fundamental since the noise affecting a signal also depends on the type of sensor with which this signal was obtained.

The invention also concerns a device that allows the determination of said reference signal B corresponding to the interference noise, as well as a device that allows the determination of the "real" vibration signals of the rotor of a rotary machine.

According to this invention, subtract the noise of an "apparent" vibration signal of the rotor of a rotary machine no matter its normal operating speed, after having validated the nature of the value subtracted: be assured that it actually corresponds to the to the noise affecting the vibration signals. The invention thus allows the monitoring of the "real" vibrations of the rotors or rotary machines in a precise and reliable manner, and thus avoid erroneous diagnostics and their dangerous consequences.

BRIEF DESCRIPTION OF THE FIGURES

FIG. 4 represents partially and schematically a frontal view of a rotary machine equipped with a device that allows the determining of the noise signal B according to the invention.

FIG. 5 represents partially and schematically the rotary machine from FIG. 4 from the left.

DETAILED DESCRIPTION OF THE PREFERRED EMBODIMENTS

Figure 1:
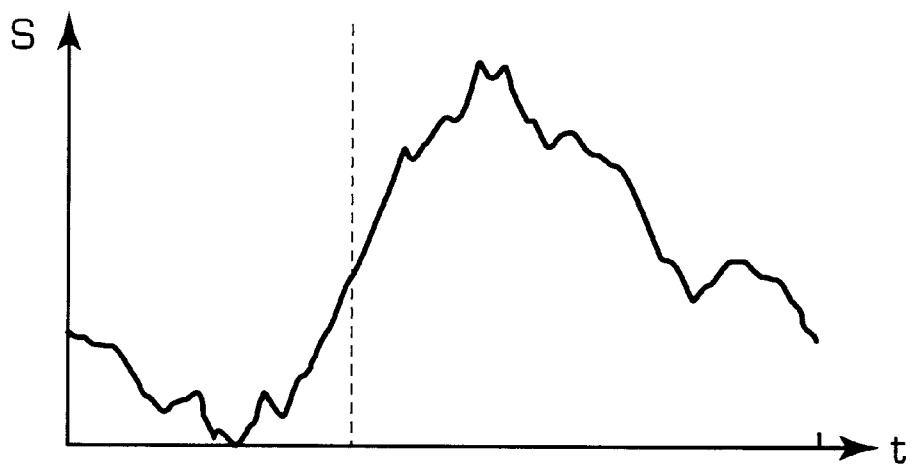
FIG. 1 represents the variations of a raw data signal S ("apparent" vibration signal) over time and over a rotation period of the rotary machine.

In the process according to the invention, subtract a prerecorded signal B from signal S of "apparent" vibration of the rotor of the rotary machine, under normal operating conditions, at the rotation speed $\Omega$.

$\Omega$ may be a set speed (speed called nominal, corresponding to a given operation level) or to the contrary, variable, as is the case in transitory operation levels (increase or decrease of the rotational speed of the rotor). The scale of $\Omega$ depends entirely on the type of machine and of its operating conditions.

In order to avoid diagnosis errors, it is required that the reference signal B effectively correspond to the interference affecting the vibration signals of the rotor of the rotary machine.

While the interference signal B is by nature independent of the rotor's rotation speed, the vibrations vary in relation to said rotation speed. This is why, according to the invention, the signal B must be acquired at a speed $\Omega_b$ of rotation of the rotor lesser than the normal operating speed $\Omega$. $\Omega_b$ must be low enough so that the rotor no longer vibrates, so that signal B, measured at this speed $\Omega_b$ only represents the interference.

It is preferable that the rotation speed $\Omega_b$ to which the acquisition of reference signal B is performed be lower than 20% of the average speed $\Omega_m$ of the rotor during normal operation.

Speed $\Omega_b$ of rotation of the rotor during acquisition of signal B can be constant (stationary rate) or vary slowly (slowly varying rate). In practice, however, it is difficult to maintain a strictly constant low rotor rotation speed. This is why it can be advantageous to perform the recording during a slowly varying rate: speed $\Omega_b$ varies slowly and continuously during the acquisition, while remaining sufficiently low. The recording is then treated by known information treatment methods to correct it, to make is equivalent to a recording performed at a constant speed $\Omega_{bm}$, $\Omega_{bm}$ being the average rotation speed of the rotor during the acquisition of the signal B at a slowly varying rate.

Also, in order to validate the signal B recorded at speed $\Omega_b$ of rotor rotation, we compare signals B1 and B2 coming from the two respective sensors C1 and C2 offset at an angle on the same measuring path. If, time offsets ignored, the two recordings are nearly identical (taking into consideration the measurement imperfections of the sensors), the user can then be certain that said signals B1 and B2 effectively correspond to the interference.

If B1 and B2 are sensibly identical, it may be concluded that at speed $\Omega_b$, at which they have been acquired, the rotor was not vibrating. Keep either signal B1 or B2 as reference as signal B since they both are nearly identical.

According to the invention, we preferentially consider that signals B1 and B2, coming from the two sensors are identical when the differences between these two signals is lower than a predetermined value. Said predetermined value is preferably a small value that generally depends on the type of the machine, of its mode of use, as well as of the required safety conditions, that the professional in this field easily knows how to evaluate.

An advantageous method of determining the reference B signal contains the following steps:

a) acquire, digitalize, and record, in function of time and at low speed of rotation $\Omega_b$, signals B1 and B2 coming respectively from at least two sensors C1, C2 of rotor displacement offset at an angle one from the other on the same measuring path, b) perform a time offset of at least one of signals B1, B2 in order to achieve a superposition of said signals, c) if signals B1 and B2 are sensibly identical, choose as reference B signal either one of said signals; otherwise, begin the process again from step a) with a new rotation speed $\Omega_{b'}$.

Therefore, to compare signals B1 and B2, that are periodical signals, perform a time offset of one of them, in order to compensate for the angle offset between the two sensors and superpose said signals.

It is obvious that the user should not limit himself to one recording, even if the corresponding B signal meets the criteria set forth above. If he wants to refine his measuring of the noise interference, he will oppositely perform a large number of recordings of signals B1 and B2, with several different low speed $\Omega_b$ of rotation of the rotor, in order to be able to later isolate, among all the recordings performed, the one for which the superposition of signals is the best.

A better method for determining the reference signal B therefore consists in choosing it from several tests of different speeds $\Omega_b$ of rotation, thus selecting the test for which the signals acquired by the means of these two sensors C1 and C2 are best superposed.

In order to compare the quality of the superposition of signals B1 and B2 acquired by the means of the respective sensors C1 and C2 during the several noise recordings performed at different speeds $\Omega_b$ of rotation, we can use different criteria.

We may for example proceed in the following manner: for a given test, if D is the signal corresponding to the difference between signals B1 and B2 after superposition (time offset), we calculate the following criteria:

$Q_{a1}$=(crest to crest maximum D value)/(crest to crest minimum B1 value)

$Q_{c2}$=(crest to crest maximum D value)/(crest to crest minimum B2 value)

$Qs_{c1}$=(spectral composition value of D)/(spectral composition value of B1)

$Qs_{c2}$=(spectral composition value of D)/(spectral composition value of B2)

For each test, calculate these criteria. The chosen B signal is then one of the many B1 and B2 signals that corresponds to the best test, which is the test for which the criteria defined above have the lowest values.

The superposition of signals B1 of B2 may be optimized if we use, to perform the calculation of signal D (difference between signals B1 and B2 after superposition), beside the value of the angle $\alpha$ between sensors C1 and C2 measured or provided by the manufacturer, values contained within a certain interval $\Delta\alpha$ around $\alpha$ and that we choose for D the lowest value found. $\Delta\alpha$ is the tolerance interval of the angle $\alpha$ and is due to the imperfection of the positioning of the sensors.

The determination of the criteria above is performed on discrete signals B1 and B2, that is to say they were discretized (sampled) at the time of their recording.

In this invention, the sensors must be located in the same plane, perpendicularly to the symmetry axis of the rotor, that is to say that they are positioned on the same measuring path.

They are offset at a known angle $\alpha$ that can be random. However, in order to reduce variables and to facilitate the comparison steps of the signals acquired with the sensors, said sensors C1 and C2 are preferably offset from one another at an angle $\alpha$ of 90 degrees.

As sensors of the rotor displacement, use any sensor allowing the measuring of physical size characteristics of the relative displacement of the rotor in the direction of said sensor. It is the case of magnetic-type sensors, but the measuring can be perform with other types of sensors such as for example capacimetric sensors, optical sensors (laser sensors), it being understood that sensors C1 and C2 are sensors of the same type.

In order to consolidate the validation of the noise signal B, the user will easily be able to adopt the methods described above to perform the acquisition in the validation of the signal by using three sensors or more, offset at an angle in the same plane perpendicularly to the axis of symmetry of the rotor. He will, for example, advantageously use three sensors, positioned at 120 degrees from one another.

The signal B is acquired, digitized, and recorded with a discretization frequency (also called sampling) $f_{db}$. The acquisition is performed on at least one rotation period of the rotor rotating at a low speed of $\Omega_b$.

We then obtain sets of type (B(t),t), B(t) being the value of signal B at time t. The number $k_b$ of discrete values is equal to the frequency of discretization $f_{db}$ divided by the frequency of rotation of the rotor $f_{rb}$, that is to say $k_b = f_{db}/f_{rb}$.

The time interval between two discrete values corresponds to $\Delta T = 1/f_{db}$.

Figure 2:
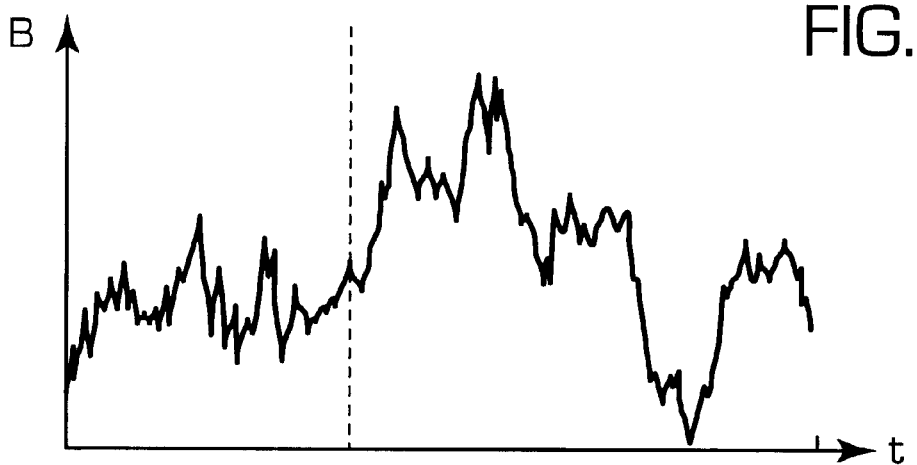
FIG. 2 represents the variations of a reference signal B (interference) such as determined by the process according to the invention, over time and over a rotation period of the rotary machine.

The whole of these value sets can be represented by the function graph on FIG. 2, where the x-axis represents time and the y-axis represents the corresponding B(t) values.

The raw data signal S, or "apparent" vibration signal of the rotor, such as represented on FIG. 1, is acquired, digitized, and recorded with a discretization frequency of $f_{dr}$. The rotor rotates at the machine's usual operating speed (speed $\Omega$), and the acquisition is performed over at least one rotation period of the rotor. We thus obtain sets of type (S(t),t), S(t) being the value of the signal S at time t. The number $k_r$ of discrete values is equal to the discretization frequency $f_{dr}$ divided by the rotation frequency of the rotor $f_r$, that is to say $k_r = f_{dr}/f_r$.

Since the low speed $\Omega_b$ of rotation of the rotor that is used to measure signal B and speed $\Omega$ of normal operating condition of the rotary machine are, by definition, different, it is necessary, if one wants to subtract signal B from signal S (for example after superposition of their respective function graphs), to stretch out in time the function of signal S and/or to compress the function of signal B. These stretchings and compressions are well known mathematical operations and consist in rediscretizing the signals in a common manner.

Besides, it is desirable to be able to compare each discrete value of the function of the raw data signal S to the corresponding discreet value on the function of the reference signal B. In other words, the number of discrete values contained in a period of signal S must be equal to the number of discrete values contained in a period of signal B. This condition can be expressed by the following formula:

$k_b = k_r$, which can be rewritten as:

$$\frac{f_{dr}}{f_r} = \frac{f_{db}}{f_{rb}}$$

In which:

$f_{dr}$ is the discretization frequency used during the acquisition of signal S.

$f_r$ is the rotation frequency of the rotor during the acquisition of signal S on the rotary machine.

$f_{db}$ is the discretization frequency used during the acquisition of signal B.

$f_{rb}$ is the rotation frequency of the rotor during the acquisition of signal B on the rotary machine.

However, this condition is usually not met in reality. Since it is not possible to modify $f_{rb}$ (because the acquisition of B cannot be performed again once the machine is in operation), nor to modify $f_r$, (because the rotation speed of the rotor cannot be freely changed since the speed is linked with the machine's operation), the Applicant then proposes to perform a rediscretization of signal B and/or a rediscretization of signal S.

Such rediscretizations are mathematical operations well known to computer professionals. They permit the following results:

from the $k_b$ discrete value sets (B(t),t), $k_b'$ sets (B'(t'),t')
from the $k_r$ discrete value sets (S(t),t), $k_r'$ sets (S'(t),t')

With $k_b' = k_r'$, signal B can then be subtracted from signal S.

For best results, the discretization and rediscretization frequencies of signals B and S should satisfy the following equations:

$$0.2 \leq f_{rdb}/f_{db} \leq 1.2 \qquad \text{For B:}$$

$f_{rdb}$ being the rediscretization of reference signal B, $$0.2 \leq f_{rdr}/f_{dr} \leq 1.2 \qquad \text{For S:}$$

$f_{rdr}$ being the rediscretization of raw data signal S.

This is so that the rediscretized values are not too far from the actual measured values.

These rediscretizations thus have the advantage of allowing the acquisition of signals in a free mode, meaning that it is not necessary for the discretization frequencies to be multiples of the rotor's rotation frequency.

Thus, if only signal B was rediscretized, the following equation would be validated:

$$\frac{f_{dr}}{f_r} = \frac{F_{rdb}}{f_{rb}}$$

If only signal S was rediscretized, the following equation would be validated:

$$\frac{f_{rdr}}{f_r} = \frac{F_{db}}{f_{rb}}$$

Finally, if both signal S and signal B were rediscretized, the following equation would be validated:

$$\frac{f_{rdr}}{f_r} = \frac{F_{rdb}}{f_{rb}}$$

Since signals B and S are periodic, the calculations can be performed during a single rotation period of the rotor. Nevertheless, if the signals have been recorded over several periods, averages can be obtained in order to optimize the determining of the noise.

Once signals S and B have been acquired and treated conformably to the preceding process, signal B, representing the noise, can now be subtracted from signal S, the "apparent" vibration of the rotor. The result is a signal V that represents the "real" vibration of said rotor.

The acquisition of the reference signal B must be performed at low motor rotation speed 106 $_b$, that is to say when the machine in not under normal operation. It is therefore advantageous for the user to take advantage of work stoppages (for maintenance purposes for example) to proceed to make a recording of this signal B immediately before the machine is started again. He then records it on appropriate media (disk, magnetic tape for example) and can later, during the operation of machine, use this reference signal B that was previously recorded to determinate at any moment the "real" vibration of the rotor of his machine.

Figure 3:
FIG. 3 represents the variations of the raw data signal S from FIG. 1 from which the reference signal B of FIG. 2 has been subtracted, over time and over a rotation period of the rotary machine.

The results which can be obtained with the invention are shown on FIGS. 1, 2, and 3.

The raw data signal S (eventually rediscretized), is represented to the scale 1 on FIG. 1. It has been acquired at the speed of rotation of the rotor Ω of 7620 rpm and corresponds to the "apparent" vibrations that include the noise.

The reference signal B (eventually rediscretized), such as that determined by the process according to the invention, is represented to the scale 0.44 on FIG. 2. It has been acquired at the speed of rotation of the rotor $\Omega_b$ of 500 rpm and corresponds to the interference noise that is included in the raw data signal S.

Signal V, which is the signal S from which signal B was subtracted, is represented to the scale 0.88 on FIG. 3. It thus corresponds to the "real" vibrations of the rotor at the rotation speed of 7620 rpm.

It is therefore immediately apparent, on FIG. 3, that at time t=i, the vibration of the rotor is substantial. Such vibration can not be determined from FIGS. 1 and 2. It can be determined on FIG. 3 thanks to the process of the invention, which permits the avoidance of diagnosis errors during the vibration monitoring of a rotary machine.

DEVICES THAT CONFORM TO THE INVENTION

The process according to the invention can be implemented with appropriate devices that are designed to be installed on a common-type rotary machine.

Thus the invention also has for purpose a device for determining the noises that affect the vibration signals of the rotor of a rotary machine.

This device is characterized by the fact that it contains at least two sensors C1, C2 of rotor displacement and placed in the same plane perpendicularly to the symmetry axis of said rotor and offset at an angle one from the other, as well as means to treat the respective signals B1 and B2 emitted by said sensors, these treatment means being able to determinate a reference signal B corresponding to the sought after noises in the following manner:

Acquisition, digitizing, and recording, in function of time, signals B1 and B2, at low rotor rotation speed $\Omega_b$, $\Omega_b$ being fixed or varying slowly, Time offsets of at least one of the signals B1, B2 in order to achieve a superposition of said signals, If signals B1 and B2 are sensibly identical, select one or the other of said signals as reference B signal; otherwise, begin the process from step a) with new rotor rotation speed $\Omega_b^1$, $\Omega_b^1$ being fixed or varying slowly, Sensors C1 and C2 are sensors of the same type, preferably magnetic-type sensors.

For best results, said treatment means contain computing capabilities.

For best results, these can select the reference signal B from several samples performed at different rotor rotation speeds $\Omega_b$, by selecting the sample for which signals B1 and B2 emitted by the two sensors superpose themselves best.

Furthermore, said treatment means contain, if necessary, known computer treatment means that allow the correction of the recorded signal B so that it will be equivalent to a recording performed at the constant speed $\Omega_{mb}$, when the acquisition of signal B has been performed at slowly varying rates of speed with an average rotor rotation speed $\Omega_{mb}$.

Such a device designed to determinate interference noise signals B is used as the rotor rotate at low speed $\Omega_b$, that is to say when the machine is not in normal operation.

The invention also contains a device for the determining of the vibrations of a rotor of a rotary machine, that is designed to be used when said machine is functioning in its normal operation mode, that is to say at a high rotation speed Ω.

This device contains at least one rotor displacement sensor C, means of digitizing, recording, and complementary treatment of signal S emitted by said sensor C, and is characterized by the fact that said complementary treatment means of signals S are capable to subtract from it a reference signal B that has been previously acquired, digitized, and recorded at rotor rotation speed $\Omega_b$ lower than operating speed Ω, $\Omega_b$ being such that the signals coming from at least two rotor displacement sensors offset at an angle in the same plane perpendicularly to the symmetry axis of said rotor are nearly identical, time offset being ignored.

Said complementary treatment means contain means of signal treatment, capable to subtract the prerecorded signal B from signal S that is acquired by sensor C when the rotor is rotating at one of its operating speeds.

For best results, said complementary treatment means are capable to rediscretize, according to predetermined frequencies, either signal S or B.

Said treatment means preferably contain computing capacities, and in particular, the means to perform calculations that are in whole or in part controlled by software consisting of an appropriate computer program.

Vibration V, obtained by calculation (by subtracting signal B from signal S), represents the "real" relative vibrations of the rotor in relation to the non-rotary structure of the rotary machine, and can be displayed on standard means of display such as a screen, printed with a printer, or used for future manipulation (for example, for a threshold comparison in order to, if need be, trigger an alarm).

The devices for the determining of reference B signal and of the true vibration signal V share numerous elements. The device for the determination of reference B signal contains at least two sensors C1 and C2, whereas the device for the determination of the true vibration signal V contains at least one sensor C1, which may be either sensor C1 or C2.

Furthermore, the means of digitizing and recording of the signals can be identical in these two devices. The means of treatment employed in these two devices should, for best results, be capable to perform other sorts of standard treatments on the signals such as calculation of average, filtering, and smoothing, etc.

This is why it is better for the user to combine these two devices in one and the same multipurpose device, which he will be able to use either for determining the reference signal B, or to determine the true vibrations V.

These functions would be best controlled with the aid of one of several software containing appropriate computer programs.

Finally, the two devices advantageously contain at least one means of determining the rotation speed of the rotor ($\Omega,\Omega_b$). This may be any common means such as for example a system that counts the rotations performed by the rotor over time with the use of a sensor (magnetic or other) detecting the passage of a mark placed on the rotor.

FIGS. 4 and 5 show a rotary machine equipped with a device that determines the reference signal B (interference noise) in conformance to the invention. The only part of the machine shown is that necessary to the understanding of the functioning of the invention, including rotor 1 which provides at least one measuring path 2. The rotor 1 is maintained by the fixed support 3.

The device to determinate interference noise signals B contains at least two sensors C1, C2 of the displacement of rotor 1, attached to the support 3 of said rotor. These sensors aim to the measuring path and are offset at angle α one from the other. Each emits a signal (B or S), that is the measure of the radial distance from rotor 1 to the measuring sensor. This device also contains acquisition, digitizing, and recording means 4, in relation to time, of the signals emitted by the sensors (C1, C2) as well as means 5 appropriate to the treatment of these signals as specified in the process of the invention.

Sensors C1 and C2 are preferably magnetic sensors. They are offset one from the other at an angle a, preferably at 90 degrees, and set in the same plane perpendicularly to the symmetry axis A of the rotor 1.

The acquisition, digitization, and recording means 4, in relation to time, of the signals emitted by sensors C1, C2 are well known to the professional. They generally contain an analyzer.

The treatment means 5 allow the selection of signal B as previously explained. For best results, they can calculate quality criteria and optimize the superposition of the signals by varying the angle between sensors around its theoretical value as explained in the explanation of the process of the invention.

Therefore, thanks to the determination of signal B by the invention, it can be considered that the signal V resulting from the subtraction of signal B from signal S is the "real" vibration of the rotor and allows the performance of a preventive diagnosis that can help avoid major failures.

The process and the devices according to the invention therefore represent particularly appropriate tools for instant or online monitoring of the operation of a rotary machine.

For best results, they are used within an automatic online monitoring systems of the operation of a rotary machine, with possible triggering of an alarm (audible or visual for example) when the machine reaches the level of vibration that exceeds the set safety threshold.

The user can therefore, with full knowledge, decide whether or not to turn the rotary machine off.

What is claimed is:

1. A process for determining vibrations of a rotor of a functioning rotary machine, said determining being performed during normal operating conditions, at high rotation operating speed Ω, said process comprising:
    a) acquiring and digitizing a signal S emitted from at least one sensor C on a displacement of said rotor when the rotor is rotating in its normal operating conditions; and
    b) subtracting a reference signal B of a same type,
    wherein B is determined beforehand,
    wherein B is acquired at rotor speed $\Omega_b$ that is lower than the operating speed Ω such that signals emitted from at least two sensors (C1, C2) of rotor displacement are nearly identical when time offsets are ignored, said two sensors being offset at an angle in a same plane perpendicular to the symmetry axis of said rotor.

2. A process according to claim 1, wherein said rotor speed $\Omega_b$ is lower than 20% of an average speed $\Omega_m$ of rotation of the rotor.

3. A process according to claim 1, wherein B is acquired at speed $\Omega_b$ such that a difference between the two signals coming from two sensors (C1, C2) is less than a predetermined value.

4. A process according to claim 1, wherein reference signal B is determined by the following:

b1) acquiring, digitalizing and recording as a function of time and at low speed of rotation $\Omega_b$, signals B1 and B2 coming respectively from at least two sensors C1, C2 of rotor displacement offset at an angle on a same measuring path,
   b2) performing a time offset of at least one of signals B1, B2 in order to achieve a superposition of said signals,
   b3) if signals B1 and B2 are sensibly identical, choosing as reference signal B either one of said signals B1 and B2; otherwise, repeating from step a) with a new rotation speed $\Omega_b$.

5. A process according to claim 1, wherein the speed $\Omega_b$ of the rotation of the rotor varies slowly and continuously during acquisition of the reference signal B, wherein the recording is then corrected by a computer so that said recording is equivalent to a recording performed at a constant speed $\Omega_{bm}$, $\Omega_{bm}$ being the average speed of the rotor rotation during the acquisition of the signal B at the slowly varying rate.

6. A process according to claim 1, wherein the reference signal B is chosen from several samples at different rotation speed $\Omega_b$, selecting a sample from said several samples for which the signals of the two sensors (C1, C2) are superposed themselves the best.

7. A process according to claim 1, wherein said sensors (C, C1, C2) of the displacement of the rotor are sensors that measure a characteristic physical distance of a relative displacement of the rotor in the direction of the measuring sensor.

8. A process according to claim 1, wherein said sensors (C1, C2) are offset at an angle of 90 degrees.

9. A process according to claim 1, wherein the signal S is acquired, digitized, then recorded as a function of time with a discretization frequency $f_{dr}$, and the signal B is acquired, digitized, then recorded as a function of time with a discretization frequency $f_{db}$, $f_{dr}$ and $f_{db}$ satisfying the following equation:

$$\frac{f_{dr}}{f_r} = \frac{f_{db}}{f_{rb}}$$

in which:
   $f_r$ is the rotation frequency of the rotor during an acquisition of signal S on the rotary machine, and
   $f_{rb}$ is the rotation frequency of the rotor during an acquisition of signal B on the rotary machine.

10. A process according to claim 1, wherein the subtraction of the reference signal B from the signal S is preceded by a rediscretization step of the reference signal B to a rediscretization frequency $f_{rdb}$.

11. A process according to claim 10, wherein the rediscretization frequency $f_{rdb}$ and the rediscretization frequency $f_{db}$ satisfy the following equation:

$0.2 \leq f_{rdb}/f_{db} \leq 1.2$.

12. A process according to claim 1, wherein the subtraction of the reference signal B from signal S is preceded by a rediscretization step of the reference signal S to a rediscretization frequency $f_{rdr}$.

13. A process according to claim 12, wherein the rediscretization frequency $f_{rdr}$ and the rediscretization frequency $f_{dr}$ satisfy the following equation:

$0.2 \leq f_{rdr}/f_{dr} \leq 1.2$.

14. The process according to claim 1 further comprising using said process for constant or online monitoring of functioning of a rotary machine.

15. The process according to claim 1 further comprising using said process for an automatic online monitoring of functioning of a rotary machine, with possible triggering of an alarm when the machine reaches a level of vibration that exceeds a set safety threshold.

16. A device for determining the interference noise affecting the vibration signals of the rotor of a rotary machine, wherein said device comprises:

at least two sensors (C1, C2) for determining a displacement of the rotor located in a same plane perpendicularly to a symmetry axis (A) of said rotor, said sensors being offset at an angle from each other, and means of treatment of B1 and B2 emitted by said sensors C1 and C2 respectively, said means of treatment being capable of determining a reference signal B that corresponds to sought after noises wherein said means of treatment acquires digitizes and records as a function of time signals B1 and B2 at low rotor rotation speed $\Omega_b$, $\Omega_b$ being fixed or varying slowly, wherein said means of treatment provides time offsets of at least one of the signals B1, B2 in order to achieve a superposition of said signals, and wherein if signals B1 and B2 are sensibly identical, said means of treatment select one of said signals as reference B signal; otherwise, said means of treatment repeats with new rotor speed.

17. A device according to claim 16, wherein said treatment means is capable of choosing the reference signal B from several samples performed at different speeds $\Omega_b$, selecting a sample for which signals B1 and B2 emitted by the two sensors (C1, C2) superpose themselves best.

18. A device according to claim 16, wherein sensors C1 and C2 are same type sensors.

19. A device according to claim 16, wherein the unit for treatment comprises computing capacities, and means to perform calculations that are at least in part controlled by software.

20. A device according to claim 16, wherein sensors C1 and C2 are magnetic-type sensors.

21. A device for determining vibrations of a rotor of a rotary machine functioning at high rotation speed $\Omega$, said device comprising:

at least one sensor C that detects displacement of said rotor;

a unit for digitization, recording, and complementary treatment of signal S emitted by said sensor C, wherein said unit for complementary treatment can subtract from the signal a reference signal B that has been previously acquired, digitized, and recorded at speed $\Omega_b$ slower than the operating speed $\Omega$, $\Omega_b$ being such that the signals emitted by at least two sensors (c1, C2) that sense displacement of said rotor are identical when time offset is ignore said sensors being offset at an angle in a same plane perpendicularly to a symmetry axis of the rotor.

22. A device according to claim 21, wherein said unit for treatment can rediscretize either signal S or B.

* * * * *